UNITED STATES PATENT OFFICE.

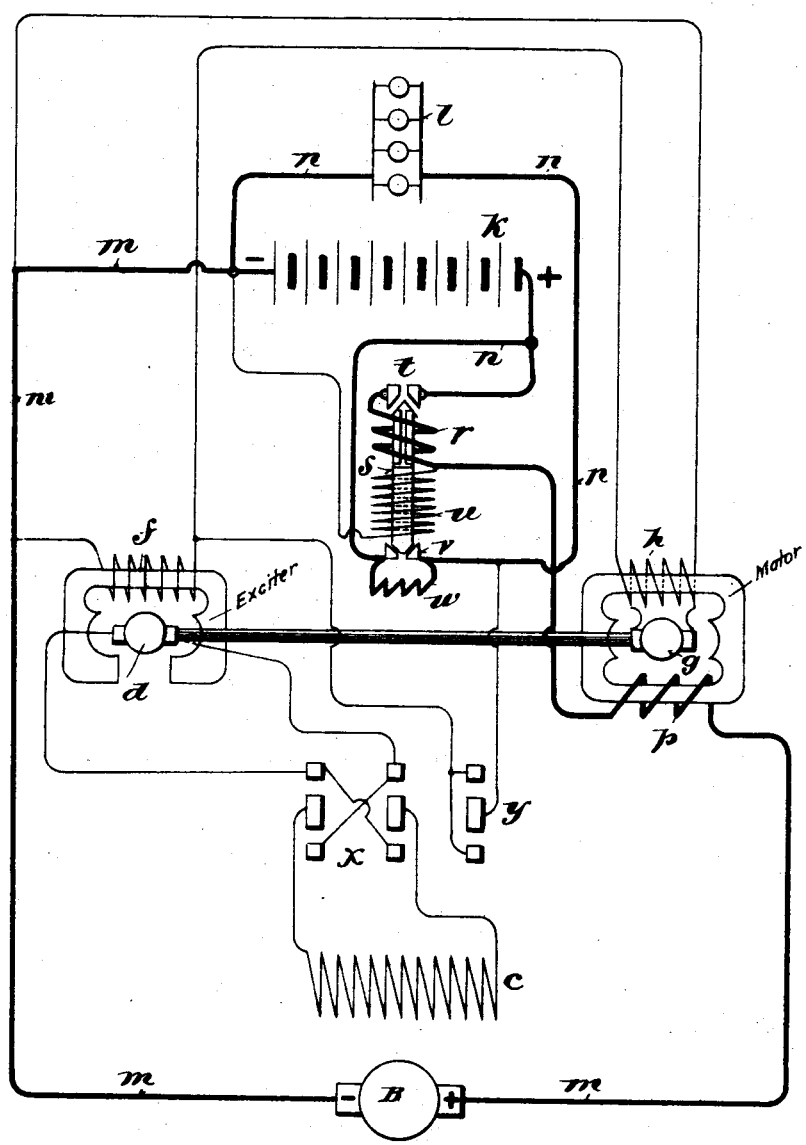

MORRIS MOSKOWITZ, OF BROOKLYN, NEW YORK, ASSIGNOR, BY DIRECT AND MESNE ASSIGNMENTS, TO JAMES H. YOUNG, TRUSTEE, OF SAME PLACE.

SELF-REGULATING SYSTEM FOR ELECTRIC LIGHT AND POWER.

SPECIFICATION forming part of Letters Patent No. 684,083, dated October 8, 1901.

Application filed March 16, 1901. Serial No. 51,480. (No model.)

*To all whom it may concern:*

Be it known that I, MORRIS MOSKOWITZ, a resident of the borough of Brooklyn, in the city and State of New York, have invented certain new and useful Improvements in Self-Regulating Systems for Electric Light and Power, of which the following is a description accompanied by a drawing.

The invention relates particularly to electric light and power systems for railway-cars and other installations in which an electric generator is driven from a variable source of power—as, for example, the car-axle—and a storage battery is used to supply current when the generator is disconnected. The system may conveniently be illustrated by a diagram of the connections for the electric lighting of a car by means of a generator the armature of which is connected to be driven by one of the car-axles.

The drawing shows a diagram of the electrical connections.

B is a generator-armature, and $c$ the field-magnet coils. The lighting-circuit is shown at $l$ and the storage battery at $k$. The battery is connected by the conductors $m$ to supply the lamp-circuit. When the battery is being charged by the generator, the voltage between the terminals of the battery is of course somewhat increased, and to compensate for this a resistance $w$ is introduced, through which a current passes when the generator is operating to feed the lamps and also to charge the battery. Switch-contacts $v$ short-circuit the resistance when the generator is idle, as will be presently explained. The generator-armature is connected by the conductors $m$ directly to one terminal of the battery and lamp circuit and through coils $p$ and $r$ and a circuit $t$ to the other end of the battery. A solenoid-core $s$ controls the circuit making and breaking switches $v$ and $t$. The solenoid-coil $u$ is connected as a shunt across the conductors $m$ from the generator-armature. The coil $u$ is so wound that it raises the solenoid-core, closing the circuit at $t$ and opening it at $v$, when the electromotive force of the generator reaches an amount sufficient to overcome that of the battery and charge the battery. When the contacts are closed at $t$, the current flows through the coil $r$, which is wound to act in the same direction upon the solenoid as the coil $u$, and therefore keeps the circuit closed at $t$. When, however, the speed of the generator decreases and its voltage falls below that of the battery, so that the current reverses in the coil $r$, the current demagnetizes the solenoid and breaks the circuit at $t$. While the circuit is closed at $t$ the current from the generator in part charges the battery and in part passes through the conductors $n$ and resistance-coil $w$ to the lamp-circuit $l$. The resistance $w$ is sufficient to compensate for the increase of voltage existing at the terminals of the battery when the generator is charging the battery. When the generator-circuit is broken at $t$, the resistance $w$ is cut out by the switch $v$, so that the battery will supply the lamps at substantially the same current as was supplied by the generator-current when the resistance $w$ was included in the circuit.

The present improvement relates, primarily, to the regulation of the generator-current. The field-coils $c$ of the generator are energized from the armature $d$ of an exciter-dynamo, the field-coils of which are supplied from the battery, as shown. A switch $y$ serves to connect or disconnect the field-coil $f$ of the exciter. A reversing-switch $x$ serves to reverse the connections of the field-coil $c$ of the generator when the direction of rotation of the armature B is reversed. The exciter is driven by a motor $g$ $h$, the armature $g$ of which may be directly connected by a shaft, as shown diagrammatically, to the armature $d$. The field-coil $h$ of the motor and also its armature-brushes are supplied from the battery-circuit, as shown, and controlled by the switch $x$. The coil $p$ in the main conductor $m$ is wound to magnetize the field-magnet of the motor in the same direction as that in which the coil $h$ acts. The windings of the motor, the exciter, and the field-magnet generator should be so proportioned that when the motor is running at full speed, with no current passing through the coil $p$, the exciter will develop current sufficient to suitably excite the main generator. When the generator is running at the minimum speed necessary to cause it to just overcome the voltage of the battery, comparatively little or no current will flow through the coil $p$ when the contacts $t$ are first closed. If now the speed of the armature B of the generator is increased, any excess of current above the normal amount passing through the coil $p$ will increase the field magnetism of the motor, and therefore decrease its speed. Such decrease in the speed of the motor, and consequently in the exciter-armature, will cut down the field magnetism of the generator, and thereby compensate for the increased speed of the generator and tend to maintain a nearly constant current in the conductors $m$. In short, as the speed of the generator increases its field magnetism decreases, and it therefore affords a substantially constant source of supply for the battery and lamp circuits.

In explaining my invention I have not implied that the switches $x$ and $y$ are automatic, because the principles of the present invention will not be altered by manually actuating them; but several forms of automatic switches for reversing the connections of generators for car-lighting are known to the art and are applicable to the present invention.

The operation of the invention may be illustrated by the following example: Supposing the main generator is designed to overcome the voltage of the battery when the car is running at a speed of fifteen miles per hour and assuming that before the car attains such speed the pole-charging switch $x$ and the circuit-making switch $y$ have been closed, it follows that when the car reaches the speed of fifteen miles an hour the field-magnet of the generator will be excited and the electromotive force developed will be sufficient to charge the battery as soon as the circuit is closed at $t$. The solenoid and its core should be so designed that it will operate to close the circuit at $t$ as soon as these conditions have been reached—that is to say, when the required electromotive force is developed in the generator the current flowing through the coil $u$ will raise the solenoid-core, closing the circuit at $t$ and simultaneously disconnecting the contacts $v$, so that the coil $w$ is included in the circuit. The motor $g$ $h$ will be operating in the meantime at its maximum speed as a simple shunt-machine, driving the small exciter and causing the field-magnet coil to be excited to the maximum. Now as the speed of the main generator-armature rises above the normal working amount it tends to send a great increase of current through the low resistance of the battery, even though the increase of electromotive force of the main generator may be very slight. This excess of current passing through the regulating-coil $p$ of the motor at once tends to reduce the speed of the motor, and consequently to reduce the field magnetism of the electromotive force of the generator.

I have found by actual test that the compounding of the field-winding of the small motor can be so nicely worked out that the voltage of the main generator may be kept practically constant, irrespective of the variations of its armature speed, through a very wide range.

The function of the resistance-coil $w$ is important. Whenever the battery is feeding the lamp-circuit the switch $v$ is closed and the full battery-voltage can act directly upon the lamps. Whenever, on the other hand, the generator is charging the battery and supplying the lamps, the circuit being closed at $t$, the excessive voltage necessary to charge the battery acts directly upon the battery; but instead of acting directly upon the lamp-circuit, and thereby increasing the brightness of the lamps, it must pass through the resistance $w$, which is sufficient to compensate for the increase and therefore maintain the lamps at a substantially constant brightness.

What I claim, and desire to secure by Letters Patent, are the following characteristic features:

1. The combination of a generator and electric circuit, a suitably-magnetized exciter for the field-coils of the generator, an electric motor actuating the exciter and supplied from a constant source, and means for varying the field magnetism of the motor in correspondence with variations in the armature-current of the generator, substantially as set forth.

2. The combination of a generator and electric circuit, a suitably-magnetized exciter for the field-coils of the generator, an electric motor actuating the exciter and supplied from a constant source, means for varying the speed of the motor inversely to the increase of armature-current in the generator, substantially as set forth.

3. The combination of a generator and electric circuit, a suitably-magnetized exciter for the field-coils of the generator, an electric motor actuating the exciter and supplied from a constant source, a storage-battery and work circuit, means for connecting the generator-armature with the battery and disconnecting it therefrom, and a series regulating-coil upon the field-magnet of the motor through which the current from the generator passes, and wound in a direction to increase the field magnetism of the motor when the current in the said coil increases, substantially as set forth.

4. The combination of a generator and electric circuit, a suitably-magnetized exciter for the field-coils of the generator, an electric motor actuating the exciter and supplied from a constant source, a storage-battery and work circuit, means for connecting the generator-armature with the battery and disconnecting it therefrom, and a series regulating-coil upon the field-magnet of the motor through which the current from the generator passes, and wound in a direction to increase the field magnetism of the motor when the current in the said coil increases, and a compensating coil connected to be included in circuit when the generator is supplying current to the battery, substantially as set forth.

Signed this 13th day of March, 1901, at New York, N. Y.

MORRIS MOSKOWITZ.

Witnesses:
HENRY S. MORTON,
CORNELIUS CAGNEY.